No. 819,316. PATENTED MAY 1, 1906.
I. N. ROGERS.
BOX OPENER.
APPLICATION FILED SEPT. 27, 1904.
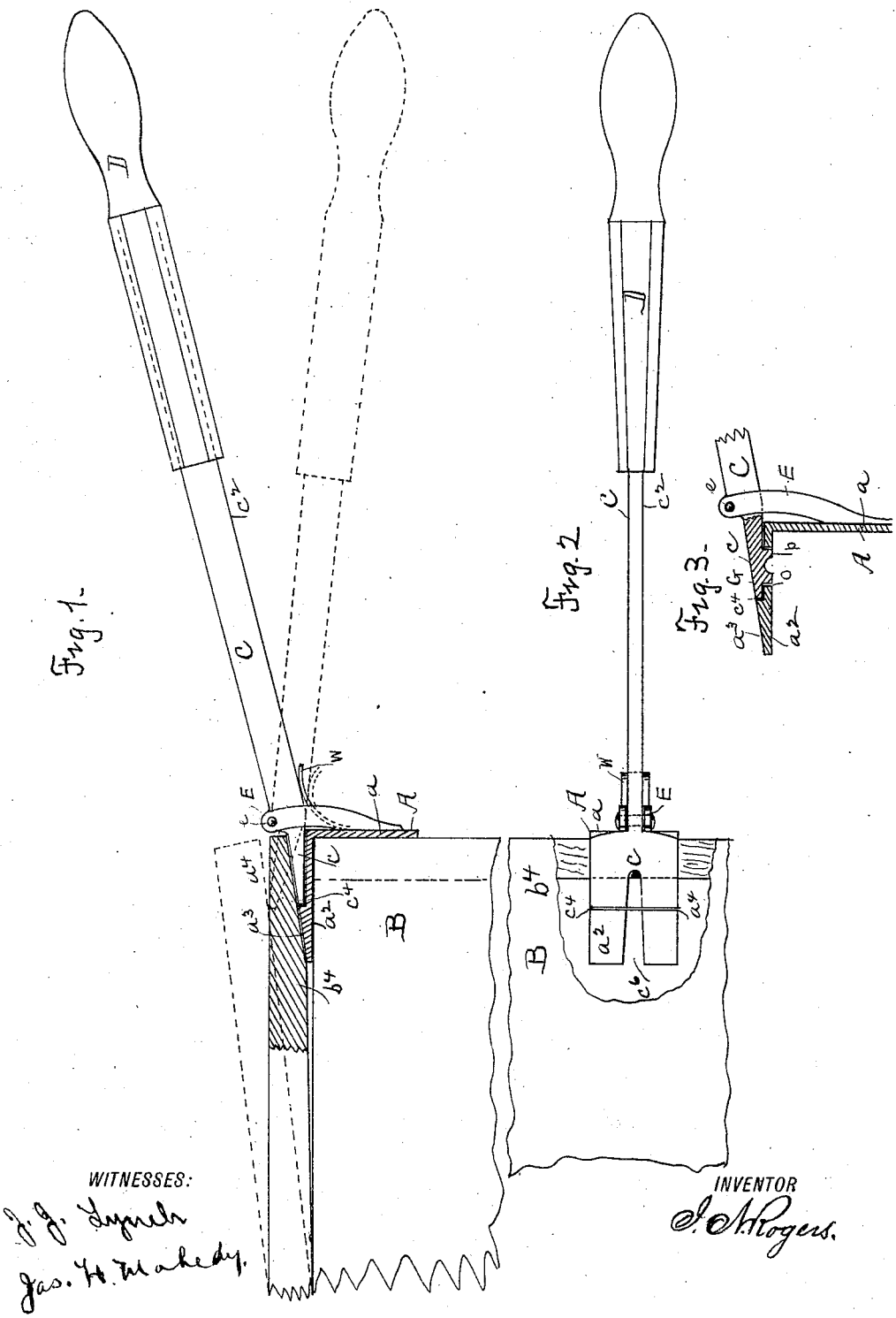
WITNESSES:
INVENTOR

UNITED STATES PATENT OFFICE.

ISAAC N. ROGERS, OF NEW YORK, N. Y.

BOX-OPENER.

No. 819,316.  Specification of Letters Patent.  Patented May 1, 1906.

Application filed September 27, 1904. Serial No. 226,162.

*To all whom it may concern:*

Be it known that I, ISAAC N. ROGERS, a citizen of the United States, and a resident of New York, in the county of New York and State of New York, have invented certain new and useful Improvements in Box-Openers, of which the following is a specification.

My invention relates to an implement for opening boxes or cases.

The object of this invention is to increase the power and efficiency of this character of implement and at the same time shorten the travel of the long member of the lever thereof and effect the result.

My invention consists of the combination of a penetrating fulcrum-rest, a curved bracket, and a lever with short horizontal member and an upward inclined long arm, also in a band-cutter in connection with the implement.

Referring to the drawings, Figure 1 is an elevation of my implement, showing it in use on a box, the dotted lines showing the position of the long arm of the lever depressed and the short arm in the act of raising the cover of the box. Fig. 2 is a plan view of the device shown in Fig. 1. Fig. 3 is a detached sectional view of the end of the implement, showing the band-cutter.

This implement consists of the right-angular rest-piece A, the vertical member $a$ thereof resting against the outside of the box B, and the horizontal member $a^2$, intended to act as a piercer for passing under the box-cover $b^4$ when the rest is driven in position, as shown in Fig. 1. The bottom of the piercer $a^2$ is straight; but the upper surface $a^3$ is beveled upward a short distance, where there is a slight depression $a^4$. From this depression the rest extends outward on a straight line. (See Fig. 1.)

This invention also consists of the lever C, comprising a short member $c$ and a long member $c^2$, which is provided with a sliding weight on the lever D.

E is a bracket preferably shaped as shown and cast onto the vertical member of the right-angle rest-piece A. The upper inwardly-curved portion of the bracket is forked to receive the lever C, which is held therein by the fulcrum-pin $e$. It will be observed that the upper curved portion of the bracket is carried above the lifting member of the lever, and it will also be observed that the end $e$ of the said bracket is curved inward—two conditions very essential to the proper working of this implement, because they give to the lifting member of the lever the required travel. The long member $c^2$ of the lever is given an upward inclination, which is regulated by the size and capacity of the implement. The object of inclining the long arm upward is to obtain a higher travel for the lifting member, and consequently a higher lift of the box-cover, than could be obtained if both members were on the same plane.

The depression $a^4$ in the horizontal member of the rest serves as a shoulder for the short blade member or lever to fall behind when the rest is driven under the cover. The blade $c$ of the lever and the horizontal member of the rest are provided with a V-shaped central slot $c^6$, which permits these members to straddle a nail when the implement is driven into place for use. The long arm of the lever is extended upward from the fulcrum-point on an obtuse angle, as shown. The object of giving this arm so great an upward inclination is to increase the power of the lever in this way. The lever-arm being above the fulcrum permits of a greater bearing-down force than if on a line therewith.

In order to make the implement useful in the way of cutting bands of iron or such like when operating as an opener, I provide the short member $c$ of the lever with a band-cutter G on the under side, (see Fig. 3,) and so that the same will cut after the manner of a male and female die, the piercing fulcrum-rest A is also provided with a slot O to receive the blade or die $p$. (See Fig. 3.) The flexible spring W, secured to the rest A and resting against the under side of the lever, is intended to hold the same in place when the implement is driven under the cover. To use the band-cutter, simply drive the piercing member of the rest under the wire or band. Then force the lever-arm upward. The short member of the lever will then press down on band and sever same.

What I claim is—

1. The combination and arrangements of the following parts, in an implement for opening boxes, the right-angle rest with depression and slot, the lever, with short member with slot, and resting in the depression of the right-angle rest for the purpose specified, and long member carried upward from the fulcrum on an angle, as shown and for the purpose set forth, and the curved fulcrum-bracket cast to the right-angle rest and extending upward on a curve line to a point above the lifting-point of the short member of the lever, for the purpose set forth.

2. In an implement for opening boxes, the combination of the following parts: the lever, with slotted short member, and long upwardly-inclined member for the purpose set forth, fulcrumed on the forked bracket cast to the rest, in such a manner as to place the fulcrum above the lifting or short member of the lever, the right-angle rest with slotted member having a depression for the purpose set forth, and the weighted handle placed on the upwardly-inclined long arm of lever for the purpose set forth.

3. In an implement for opening boxes, the lever with the long arm having weighted handle, and a short or lifting arm with the center slot, and a cutting blade or die on the under side, the fulcrum-rest with the vertical member and outwardly and inwardly curved bracket to which the lever is fulcrumed and a horizontal member, with the center slot, and die-slot to receive the blade or die of the short lever-arm for the purpose of cutting the bands of boxes.

Signed at New York, in the county of New York and State of New York, this 26th day of September, A. D. 1904.

ISAAC N. ROGERS.

Witnesses:
F. BARRETT,
H. E. ROGERS.